Dec. 30, 1941.　　G. F. PAGNARD　　2,268,081
TIGHTENING DEVICE
Filed Dec. 13, 1939
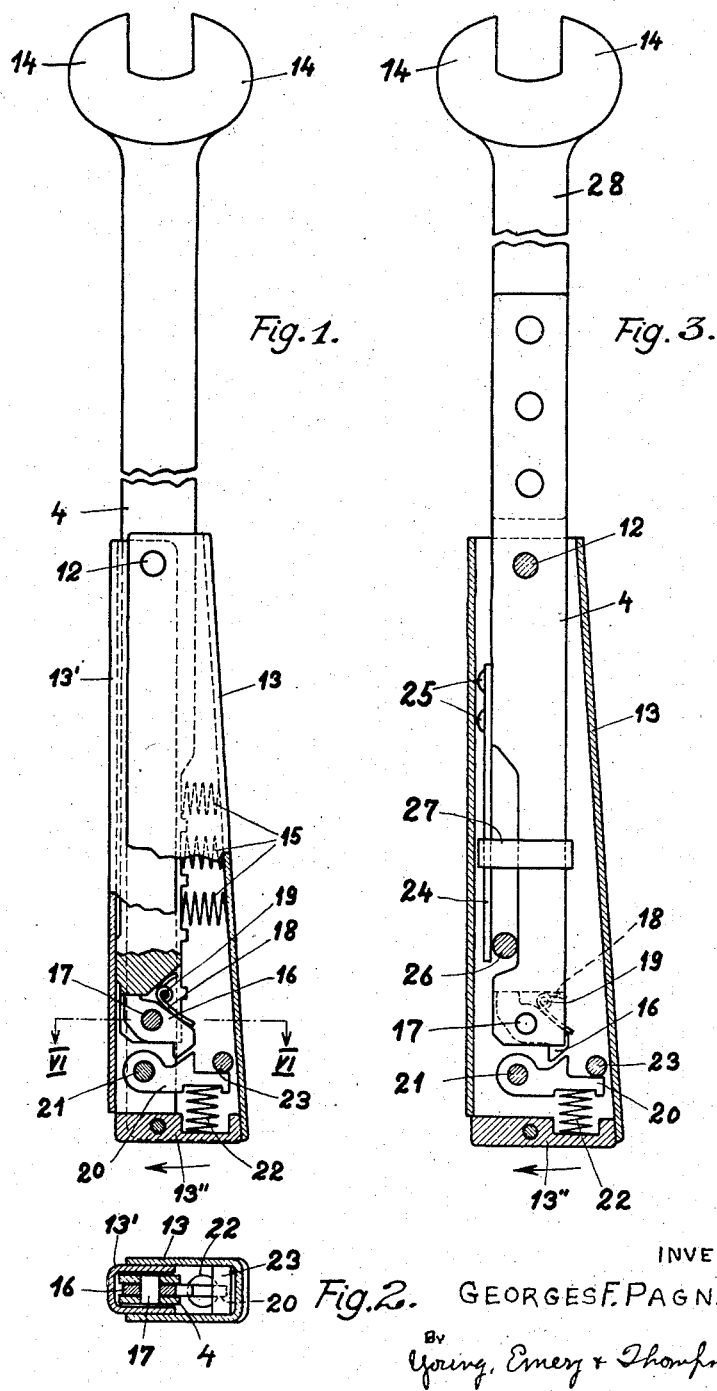
INVENTOR
GEORGES F. PAGNARD
By
Young, Emery & Thompson
ATTYS.

Patented Dec. 30, 1941

2,268,081

UNITED STATES PATENT OFFICE 2,268,081

TIGHTENING DEVICE

Georges Frederic Pagnard, Moutier, Switzerland

Application December 13, 1939, Serial No. 309,091
In Switzerland April 11, 1939

2 Claims. (Cl. 81—53)

The present invention relates to a tightening device, specially but not exclusively to a wrench, in which means are provided to permit of the limitation of the tightening force to a predetermined value. One of these means can, for instance, be a spring of such dimensions that it yields perceptibly when the tightening force exceeds a certain limit. It is another object of the invention to arrange further means for controlling the moment when said predetermined value of the tightening force is reached.

Further objects and features of the invention will be apparent as the following description proceeds, reference being had to the accompanying drawing, in which Fig. 1 is partly a plan-view and partly a section of a first embodiment;

Fig. 2 is a cross-section taken on line VI—VI of Fig. 1 and

Fig. 3 is partly a plan-view and partly a section of a second embodiment.

The wrench illustrated in Figures 1 and 2 comprises a lever 4 pivoted with the aid of pin 12 in the interior of a hollow handle made in two parts 13 and 13'. Lever 4 carrying fixed jaws 14 at one end tapers towards its other end, while the hollow handle 13 is enlarged towards its free end. Several helical springs 15 act on the tapered part of lever 4 and bear against the wall of the hollow handle 13. These springs 15 are of such dimensions that they yield when the tightening force exerted on the hollow handle 13 in the direction of the arrow exceeds a predetermined value. At this moment handle 13 can pivot on pin 12 at a certain angle relatively to the hollow handle.

In order that the worker may perceive the moment when springs 15 give way, a latching-mechanism is provided whose latching is felt by the hand of the worker holding the tool. This mechanism comprises two pawls located on the free end of lever 4 and designed to cooperate with each other. One of these pawls, 16, is flexibly fixed to lever 4 by means of a bolt 17; it is under the effect of a spring 18 bearing against a shoulder of lever 4 and placed on a pin 19. The other pawl 20 is pivoted on part 13' of the hollow handle by means of bolt 21; this pawl is under the effect of helical spring 22 acting parallel to the axis of the handle and resting upon the bottom 13" of said handle. This spring tends to press the pawl 20 against stop 23.

Springs 15 when yielding under the tightening force exceeding the predetermined limit, cause handle 13 to pivot around its pin 12; pawl 16, fixed to lever 4, forces pawl 20 against the effect of spring 22 until the jaw of pawl 20 has passed that of pawl 16. At this moment spring 22 jerks pawl 20 back which strikes violently on stop 23. This latching is distinctly felt by the hand of the worker holding the tool and it indicates exactly the moment when the predetermined amount of tightening force is reached.

As soon as the tightening power, exerted on the hollow handle is raised, i. e. immediately after the latching has been perceived, lever 4 and the hollow handle regain their mutual outgoing position under the effect of springs 15 whose force is considerably higher than that of springs 22 and 18 taken together. Pawl 16, pivoted at 17 is pushed back against the effect of spring 18 by means of the jaw of pawl 20, and after said jaw has passed pawl 16, the latter, under the effect of spring 18, again takes the position illustrated in Fig. 1.

In the embodiment shown in Figure 3 the latching mechanism is the same as that of the example given in Figure 1. The device for limiting the tightening only is modified in such a way that the helical springs 15 are replaced by plate spring 24, with adjustable tension, which, at one end is fixed to lever 4 by means of two screws 25. The free end of spring 24 acts on a pin 26 secured to hollow handle 13. A ring 27 adapted to be displaced along lever 4 allows the bearing and, therefore, the spring-force to be altered and, in this way, the predetermined tightening power to be modified within certain limits. In this embodiment jaws 14 are not made in one piece with lever 4, but with shank 28 which is either detachably or constantly fixed to lever 4.

While I have described and illustrated three embodiments of my invention, I do not wish unnecessarily to limit the scope of this invention, but to reserve the right of making such modifications and rearrangements of the several parts as may come within the purview of the accompanying claims.

What I claim is:

1. A tightening device shaped as a wrench, comprising a lever provided with jaws and having a tongue at the end opposite said jaws, a hollow handle pivoted on said lever, helical springs resting with one end upon said tongue and with the other end upon the wall of said hollow handle, said helical springs being of such dimensions that they are adapted to give way under the effect of a predetermined tightening force and a latching mechanism adapted to control the moment when said helical springs give way, said latching mechanism comprising a primary pawl pivoted on the end of the tongue of the lever and a secondary pawl pivoted on the end of the hollow handle, said primary and secondary pawls having jaws, springs adapted to normally hold said last named jaws engaged with each other and a stop secured to the hollow handle and adapted to hold said secondary pawl against its operating spring, said secondary pawl being firstly driven away from said stop against the effect of its operating spring by the jaw of said primary pawl when the lever gives way and then violently jerked against said stop when the jaw of the primary pawl has passed the jaw of the secondary pawl, whereby a click is distinctly felt by the hand of the worker holding the wrench.

2. A device as claimed in claim 1 in which the force of the springs which are adapted to give way under the effect of a predetermined tightening force is higher than that of the auxiliary springs operating the pawls of the latching mechanism, whereby said pawls are caused to regain automatically their mutual outgoing position immediately after the click has been felt.

GEORGES FREDERIC PAGNARD.